(12) United States Patent
Hall

(10) Patent No.: US 6,346,985 B1
(45) Date of Patent: Feb. 12, 2002

(54) OPTICAL METHOD FOR THE TRANSDUCTION OF REMOTE ARRAYS OF ELECTROMECHANICAL SENSORS

(75) Inventor: David B. Hall, La Crescenta, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 11 days.

(21) Appl. No.: 09/688,004

(22) Filed: Oct. 12, 2000

Related U.S. Application Data

(60) Provisional application No. 60/162,575, filed on Oct. 29, 1999.

(51) Int. Cl.[7] .................................................. G01B 9/02
(52) U.S. Cl. ........................................ 356/477; 356/478
(58) Field of Search ................................ 356/477, 478, 356/250; 250/227.19, 227.27; 385/12

(56) References Cited

U.S. PATENT DOCUMENTS

| | | | |
|---|---|---|---|
| 4,848,906 A | | 7/1989 | Layton |
| 5,313,266 A | * | 5/1994 | Keolian et al. ............. 356/477 |
| 5,497,233 A | | 3/1996 | Meyer |
| 5,796,504 A | | 8/1998 | Sonderegger et al. |
| 6,134,015 A | * | 10/2000 | Hall ........................... 356/478 |
| 6,211,982 B1 | * | 4/2001 | Goldner et al. ............. 359/142 |

OTHER PUBLICATIONS

"Low Cost Fiber Optic Interferometric Sensors", Jeff Bush et al., SPIE vol. 2872, Second Pacific Northwest Fiber Optic Workshop, Courtesy Optiphase, Inc., pp. 1–6.

"High Efficiency Phase Modulator" purchase order, Oct. 01, 1999, Jeff Bush—Optiphase, 3 pages.
"GS–20DX", Geo Space Corporation, 2 page advertisement.
"Ultraphone Mark 2 Gemini Gimbal High Performance Geophone", Mark Products, Oct. 1996, 2 page advertisement.
"Ultraphone Mark 2–3W", Mark Products, 2 page advertisement.
"Performance of a MultiChannel Fiber Optic Accelerometer Array During a Undersea Structural Monitoring Test", S.T. Vohra et al., Naval Research Laboratory, 1 page.
"Interrogation of a Conventional Current Transformer by a Fiber–Optic Interferometer", Y.N. Ning et al., 1991 Optical Society of America, 1 page.

* cited by examiner

*Primary Examiner*—Samuel A. Turner
(74) *Attorney, Agent, or Firm*—Lynn & Lynn

(57) ABSTRACT

An electromechanical sensor produces an electrical signal in response to a change in a physical parameter being monitored by the sensor. An optical phase modulator is arranged such that electrical signals from the electromechanical sensor cause a phase change in optical signals propagating in the two legs of the interferometer. The phase change is obtained by forming the interferometer to have a phase modulator in each leg. Applying the electrical signal to the phase modulators, which are connected in push-pull, changes the optical path length difference between the interferometer legs and produces an optical signal that can be transmitted to a remote location. A photodetector at the remote location converts the optical signal into an electrical signal that can be processed to measure changes in the parameter. The sensors may be used singly, or a plurality of sensors may be arranged in a geophone array.

10 Claims, 4 Drawing Sheets

OPTICAL METHOD FOR THE TRANSDUCTION OF REMOTE ARRAYS OF ELECTROMECHANICAL SENSORS

This appln claims benefit of Prov. No. 60/162,575 filed Oct. 29, 1999.

BACKGROUND OF THE INVENTION

This invention relates generally to systems for transmitting a signal output from an electromechanical sensor to a location where the signal may be processed to determine value for a physical parameter detected by the sensor. This invention relates particularly to converting an electrical signal output from an electromechanical sensor into an optical signal for transmission to a processing location remote from the electromechanical sensor. Still more particularly, this invention relates to a system for applying an electrical signal output from an electromechanical sensor to an optical phase modulator included in a leg of an interferometer to produce an optical phase shift that is a function of the electrical signal.

Electromechanical sensors such as geophones are planted in the earth to detect ground motion. Applications of geophones include geophysical exploration and earthquake detection and measurement. Moving mass geophones that use the Faraday effect to detect ground motion are well-known in the art.

Other electromechanical sensors such as piezoelectric hydrophones are placed in underwater cables to detect acoustic waves in the ocean. A piezoelectric hydrophone responds to water pressure changes in the acoustic waves to generate a voltage.

There are examples of electrical-mechanical sensors that exist in systems requiring hundreds, and in some cases thousands of sensors, that are used to generate acoustic maps or signatures covering a large spatial volume. These maps can be used to detect subterranean oil deposits and shipping traffic for example. Such sensors are also used in ocean bottom cables and in boreholes.

The outputs of all of these sensors are electrical in nature and must be sent back to a remote location for data retrieval. Coaxial cables or twisted pair cables with multiplexing capability and with limited bandwidth and range are typically used. In a conventional system, active signal amplification of each sensor output at or very near the sensor location is necessary to obtain a sufficiently large output at the remote location for obtaining any useful data.

SUMMARY OF THE INVENTION

The present invention overcomes the disadvantages of conventional electromechanical systems by converting the electrical signal output from each sensor into an optical signal that can be transmitted on a fiber optic telemetry cable without amplification. The present invention also allows filtering of the electrical signal before it is converted into an optical signal.

A sensor system according to the present invention comprises an electromechanical sensor that produces an electrical signal in response to a change in a physical parameter being monitored by the sensor. An optical phase modulator is connected to the electromechanical sensor to receive the electrical signal therefrom. An optical interferometer is arranged to have the phase modulator included in one its legs such that the electrical signal output by the electromechanical sensor causes the phase modulator to produce a phase change between optical signals propagating in the first and second legs. The phase change is related to the magnitude of the change in the physical parameter.

Preferably both legs of the interferometer include an optical phase modulator connected in push-pull to increase the phase change and provide a stronger optical signal.

The sensor system also preferably includes a filter connected between the output of the electromechanical sensor and the phase modulators so that only voltages associated with a selected frequency range are applied to the phase modulators.

An appreciation of the objectives of the present invention and a more complete understanding of its structure and method of operation may be had by studying the following description of the preferred embodiment and by referring to the accompanying drawings.

DETAILED DESCRIPTION OF THE PREFERRED EMBODIMENT OF THE INVENTION

Figure 1:
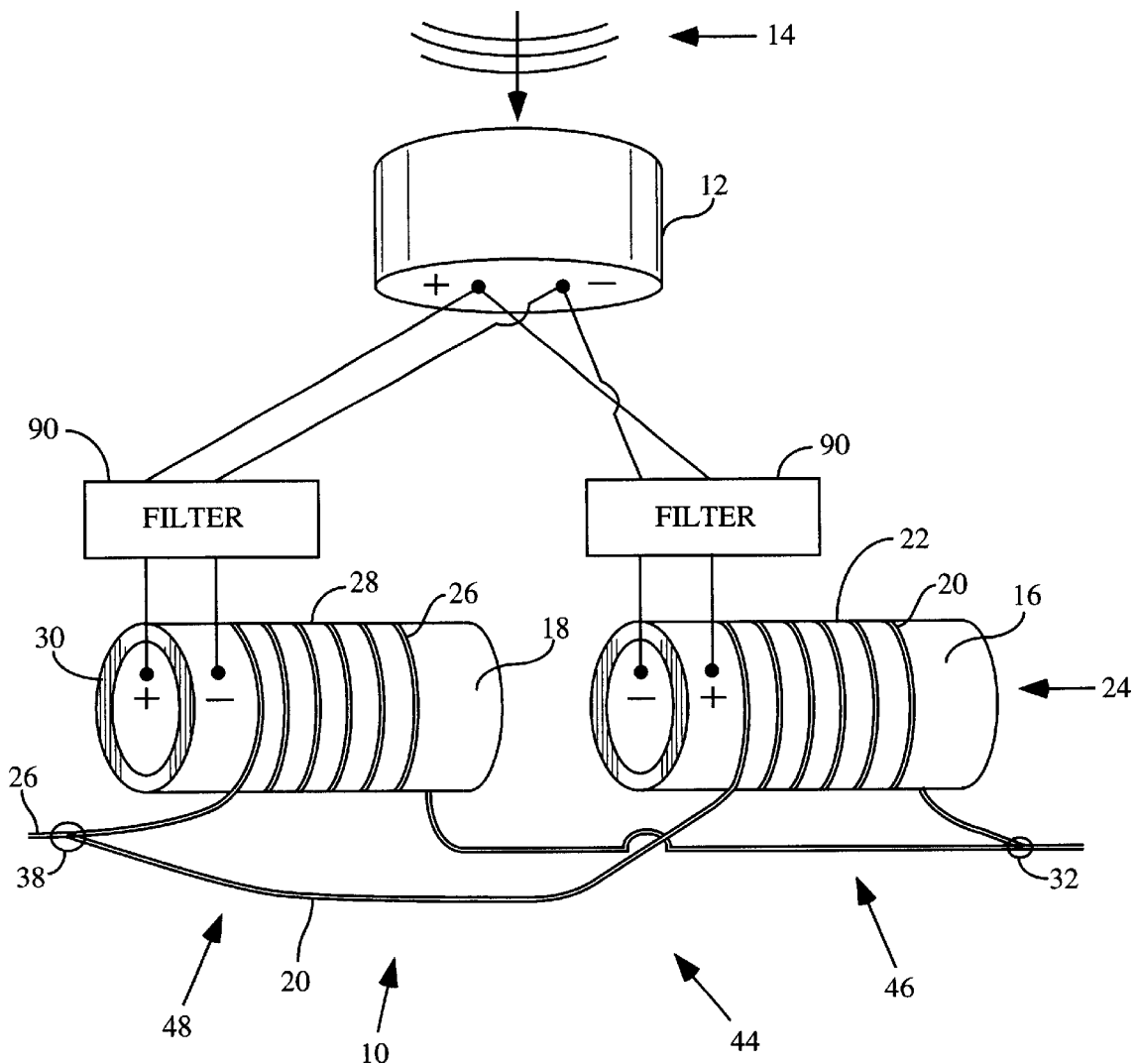
FIG. 1 illustrates an electromechanical sensor providing a signal output to a push-pull arrangement of two piezoelectric optical phase modulators connected so that they are each included in two separate legs of a Mach Zehnder fiber optic interferometer.

FIG. 1 shows a sensor system 10 that includes an electromechanical sensor 12 arranged to produce an electrical signal output in response to an incident acoustic wave or ground movement indicated by the horizontal lines and the arrow 14. The electrical signal is applied to each of a pair of fiber optic phase modulators 16 and 18. The phase modulator 16 includes an optical fiber 20 wound around the exterior surface 22 of a piezoelectric cylinder 24. The phase modulator 18 includes an optical fiber 26 wound around the exterior surface 28 of a piezoelectric cylinder 30.

A first optical coupler 32 is arranged to couple light between the optical fiber 20 and of the optical fiber 26. A second optical coupler 38 is arranged to couple light between the optical fiber 20 and the optical fiber 26. Thus the optical fibers 20 and 26 and the couplers 32 and 38 form a Mach-Zehnder interferometer 44. The optical fiber 20 and phase modulator 16 form a first leg 48 and the optical fiber 26 and phase modulator 18 form a second leg 46 of the interferometer 44.

Piezoelectric optical phase modulators are well-known in the art. A brief description of a typical piezoelectric optical phase modulator structure is presented below. Each of the phase modulators 16 and 18 comprises a length of fiber optic cable wrapped under tension in a tight helical wind on its cylindrical piezoelectric tube or disc, respectively. As the diameter of the piezoelectric cylinder is modulated by an applied voltage, the length of the wrapped fiber is also modulated. An optical phase shift proportional to the applied voltage is generated with typical scale factors of tens of radians per volt.

There are two generally known ways to produce optical phase modulation in optical fiber waveguides. One is to change or modulate the index of refraction of the waveguide, and the other is to stretch the optical fiber. The index changing approaches typically use integrated optic devices and are presently commercially available for considerably more than $1000.00 each. Fiber stretching devices are less expensive. Typically a fiber stretching phase modulator uses either piezoelectric or magneto-strictive techniques. The phase modulators used in the present invention may be satisfactorily formed using thin walled piezoelectric cylinders (tubes). The relationships governing the operation of these devices are described below.

A PZT phase modulator is constructed by winding optical fiber around a PZT ceramic tube and applying a voltage V at a frequency ω. An expression for the amount of optical phase shift per applied voltage for an optical modulator fabricated by winding one layer of fiber on a PZT tube is:

$$\frac{\Delta \phi}{V} = \frac{kRhd_{31}}{\lambda d_{fiber} t}$$

where k is a constant, h is the height of the tube, R is the tube radius, λ is the optical wavelength, $d_{fiber}$ is the fiber jacket outer diameter, and t is the wall thickness.

Note that for a tube fiber wound PZT phase modulator, the phase shift per applied voltage is a function of radius, tube height and thickness. To optimize tube designs, the diameter and height should be made as large as required to achieve the desired modulation and, of course, the tube thickness should be minimized. Multiple layer winds can be employed to increase the modulation constant while maintaining a small package size.

Referring again to FIG. 1, an optical signal propagates in the optical fiber 26 to the coupler 38. The coupler 38 divides the input optical signal between the optical fibers 20 and 26. The portion of the input optical signal that remains in the optical fiber 26 is input to the phase modulator 18 while the portion coupled into the optical fiber 20 is input to the phase modulator 16. The coupler 32 combines the optical signals after they have propagated along different optical paths. The combined optical signals produce an interference pattern that is the optical signal output from the Mach-Zehnder interferometer 44.

Changes in the optical path length difference of the two legs 46 and 48 are seen as changes in the interference pattern when it is detected by a suitable detector (not shown). The electrical signal output from the electromechanical sensor 12 is applied to the phase modulators 16 and 18 with opposite polarities to provide a push-pull effect. Thus, when the leg 46 become longer, the leg 48 becomes shorter. Push-pull operation of the phase modulators 16 and 18 provides double the amount of optical path length change that could be obtained with a single phase modulator in only one leg of the Mach-Zehnder interferometer 44.

Therefore, when changes in the parameter being monitored occur, the resulting electrical signal output to the phase modulators 16 and 18 changes the optical path lengths as described above. This change in optical path length difference produces a phase shift in the optical signals propagating in the two legs 46 and 48. The phase shift is proportional to the voltage output by the electromechanical sensor 12.

The optical phase shift then becomes the signal that is output from the sensor system 10.

Figure 2:
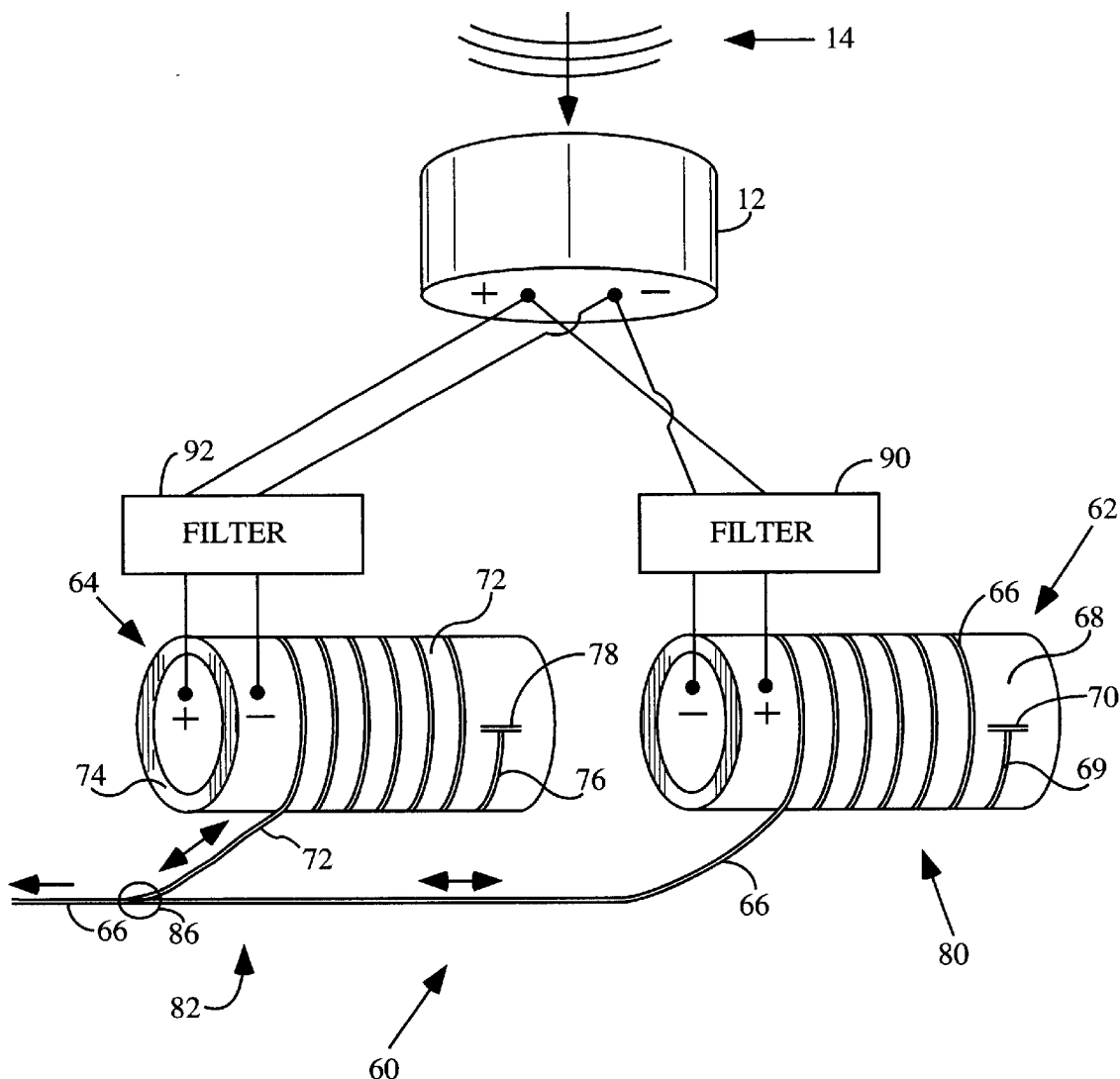
FIG. 2 illustrates an electromechanical sensor providing a signal output to a push-pull arrangement of two piezoelectric optical phase modulators connected so that they are each included in two separate legs of a Michelson fiber optic interferometer.

FIG. 2 illustrates an embodiment of the invention that includes a Michelson interferometer 60. The electrical signal output from the electromechanical sensor 12 is input to a pair of phase modulators 62 and 64. The phase modulator 62 includes an optical fiber 66 wound on a piezoelectric cylinder 68. An end 69 of the optical fiber 66 is terminated with a mirror 70. In like manner the phase modulator 64 includes an optical fiber 72 wound on a piezoelectric cylinder 74 with an end 76 of the optical fiber 72 being terminated with a mirror 78. The optical fiber 66, the piezoelectric cylinder 68 and the mirror 70 are included in a first leg 80 of the Michelson interferometer 60. Likewise, the optical fiber 72, the piezoelectric cylinder 74 and the mirror 78 are included in a second leg 82 of the Michelson interferometer 60

An optical signal propagates in the optical fiber 66 to a coupler 86, which divides the optical signal between the optical fibers 66 and 72. The portion of the optical signal remaining in the optical fiber 66 propagates through the phase modulator 62 to the mirror 70 and then reflects back to propagate in the opposite direction in the optical fiber 66 back to the coupler 86. The portion of the optical signal coupled into the optical fiber 72 propagates through the phase modulator 64 to the mirror 78 and then reflects back to propagate in the opposite direction in the optical fiber 72 back to the coupler 86. The coupler 86 combines the signals that have reflected from the mirrors 70 and 78 to produce an interference pattern, which is the optical signal output from the Michelson interferometer 60.

In the same manner described above for the Mach-Zehnder interferometer 44, changes in the optical path lengths of the legs 80 and 82 of the Michelson interferometer 60 produce a phase change in the optical signals propagating therein. The phase change in the optical signals may be processed to determine the change in the parameter being monitored.

In both embodiments described above, the fiber optic interferometers 44 and 60 are designed using appropriate methods of acoustic isolation so that they do not detect any acoustic disturbances directly. Both of the fiber optic interferometers 44 and 60 have the purpose of converting the output voltage of the electromechanical sensor 12 to a proportional optical phase shift amenable to transfer via optical fibers to a remote location for data retrieval.

In both the Mach-Zehnder interferometer 44 and the Michelson interferometer 60, it is necessary to have a sufficient path length mismatch between the two legs for optical signal processing with appropriate frequency modulation of the optical signal sources 50 or 84, respectively. Path length mismatches range between about two centimeters and about two meters to make this device compatible with existing fiber optic sensor architectures. There will be slow drifts of the optical path lengths within the fiber legs over time and temperature. For a one ° C. change in temperature in one minute there is interference fringe motion corresponding to 0.1 Hz for a one meter mismatch assuming a uniform temperature environment for the interferometer. At frequencies above a minimum of about one to five Hz, the fringe motion is entirely due to the optical phase shift produced by the electromechanical sensor output voltage.

There are distinct advantages to the optical method for the transduction of remote arrays of electromechanical sensors over the competing methods. These other methods are the traditional approach of sending the sensor output voltages back to a remote location via coaxial or twisted pair cables and the all fiber optic approach using fiber optic sensors and fiber optic cables.

As previously discussed, there are two chief drawbacks to the traditional method. First, as a transmission medium, electrical cables are greatly inferior to fiber optic cables from the considerations of range, bandwidth and multiplexing capability. Second, active electronics are required in the vicinity of the sensor to amplify the signal for return to a remote location.

Fiber optic sensors such as hydrophones and accelerometers sensitive to the phase shift of some input disturbance are non-linear output devices with a raised cosine response, unlike electromechanical sensors with an output proportional to the input.

Referring again to FIG. 1, the signal output from the electromechanical sensor 14 may be input to filters 90 and 92 before being input to the respective phase modulators 16 and 18. The filters 90 and 92 may also be added between the electromechanical sensor 14 and the phase modulators 62 and 64, respectively, of FIG. 2. The voltage output from the electromechanical sensor 14 can be modified with simple passive electrical filters at or very near to the sensor location to tailor the output frequency response. Low pass, high pass, and notch filters can be used to remove undesired out of band signals that can mask or degrade the signals of interest.

The same routine filtering cannot be done with fiber optic sensors by filtering elements in the vicinity of the sensor. Whatever filtering that can be done must happen at the remote location where all the sensor return data is collected and processed. A more serious problem is the inability to filter out large out-of-band frequency tones and their intermodulation products. The maximum fringe rate or frequency generated by the raised cosine response of an acoustic tone is proportional to the product of the zero to peak tone amplitude and the tone frequency. A low frequency tone that can be easily filtered out using an electromechanical sensor with a passive electrical filter can have such a large amplitude that the fringe rate is above the bandwidth of an analog receiver or the Nyquist frequency of a digital receiver thereby causing the system to malfunction.

Therefore, the hybrid approach contains the best features of the all electrical and all optical approaches because of the capability of having simple electrical filtering at the sensor locations and the fiber optic transmission of the sensor returns back to a remote location for data retrieval.

Figure 3:
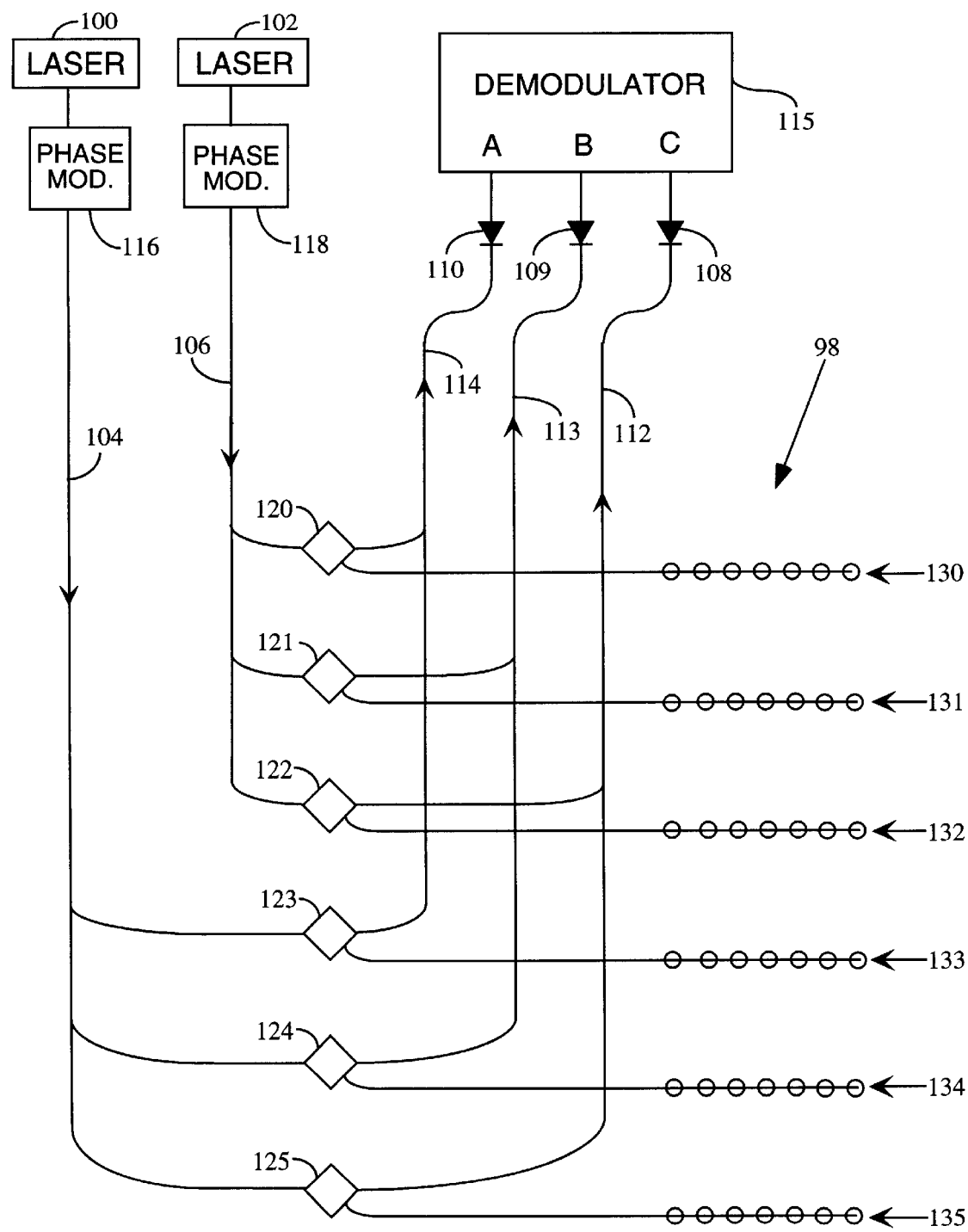
FIG. 3 illustrates an array of electromechanical sensors arranged to provide output signals to a plurality of fiber optic interferometers in a time division multiplexed (TDM) architecture.
Figure 4:
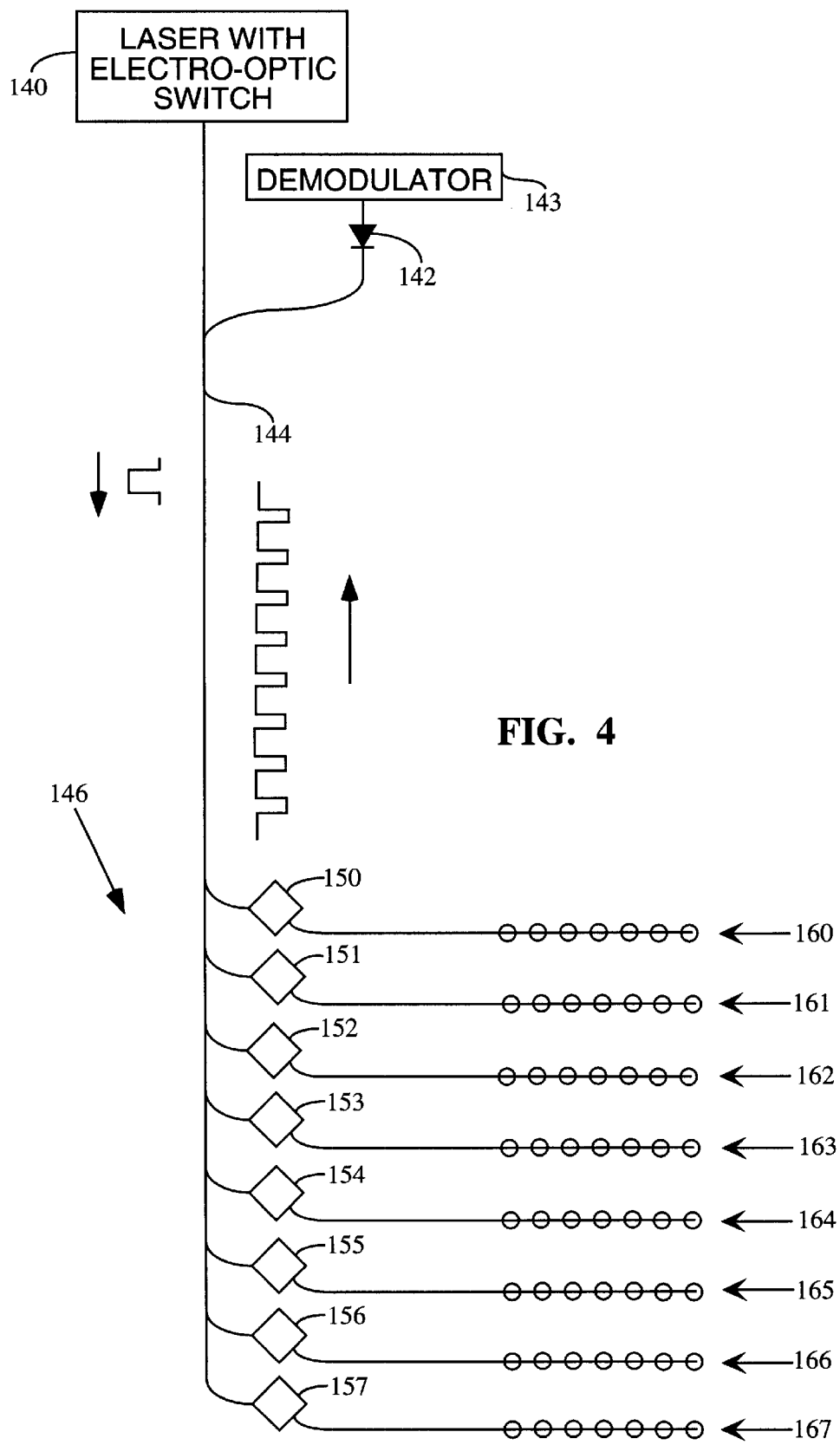
FIG. 4 illustrates an array of electromechanical sensors arranged to provide output signals to a plurality of fiber optic interferometers in a frequency division multiplexed (FDM) architecture.

Examples of two array architectures are shown in FIGS. 3 and 4. FIG. 3 shows an FDM architecture 98 with two lasers 100 and 102 that provide optical signals to a pair of input optical fibers 104 and 106, respectively. Three polarization diversity detectors 108–110 receive interference output signals from corresponding output telemetry optical fibers 112–114. The detectors 108–110 provide electrical signals to a demodulator 115 respectively. Each laser 100 and 102 has a separate phase modulator 116 and 118, respectively, with phase generated carrier frequencies $f_1$ and $f_2$. The optical fiber down leads 104 and 106 from the lasers 100 and 102, respectively, deliver optical signals to six optical interferometer locations 120–125. The output optical fibers 112–114 are return leads going back to the three polarization diversity detectors 108–110. Each of the interferometer locations 120–125 contains a single piezoelectric optical phase modulator of the type described above with reference to FIGS. 1 and 2 that are driven by a corresponding localized linear array 130–135 of seven electromechanical sensors. The electromechanical sensors total 42 in a 6 by 7 array. This type of array architecture can be increased in size to more than one hundred optical interferometer locations each with a phase modulator driven by up to a dozen or more electromechanical sensors such as geophones.

FIG. 4 shows a TDM array architecture with one pulsed laser source 140 and one detector 142 that is connected to a demodulator 143. The TDM array 138 includes a single optical fiber 144 serving as both a down lead and return lead and a linear array 146 of eight Michelson interferometers 150–157 of the type shown in FIG. 2. The laser 140 sends down one optical pulse to the interferometers 150–157. Eight pulses return to the detector 142. Each of the interferometers 150–157 includes a phase modulator of the type described above with reference to FIGS. 1 and 2. In each of the interferometers 150–157, the corresponding phase modulator is driven by a localized linear array 160–167, respectively, of seven electromechanical sensors of the type previously described. By using a system with distributed gain from erbium doped fiber amplifiers and a pump laser in addition to the signal laser 140, the array architecture 138 can be increased to fifty or more optical interferometer locations for the single signal laser 140.

For geophysical applications an FDM or TDM system can use a single fiber optic cable of a length of one to ten kilometers or more that can obtain data from many hundreds of remote electromechanical sensors with no active electronic components except at the one location for the laser transmitter and optical receiver with the appropriate signal processing and demodulation functions. This is a significant advantage over previous architectures.

What is claimed is:

1. A sensor system, comprising:
   an electromechanical sensor that produces an electrical signal in response to a change in a physical parameter being monitored by the sensor;
   an optical phase modulator connected to the electromechanical sensor to receive the electrical signal therefrom; and
   an optical interferometer having a first leg and a second leg that define first and second optical path lengths, respectively, the optical phase modulator being included in one of the first and second legs of the optical interferometer, the optical interferometer and the phase modulator being arranged such that the electrical signal output by the electromechanical sensor causes the phase modulator to produce a phase change between optical signals propagating in the first and second legs, the phase change being indicative of the magnitude of the change in the physical parameter.

2. The sensor system of claim 1 wherein the optical interferometer is formed as a Michelson interferometer.

3. The sensor system of claim 1 wherein the optical interferometer is formed as a Mach-Zehnder interferometer.

4. A sensor system, comprising:
   an optical signal source arranged to provide a pulsed optical signal output;
   an optical fiber arranged to receive the optical signal output from the optical signal source;
   a plurality of optical interferometers coupled to the optical fiber; and
   a plurality of electromechanical sensor arrays arranged to produce electrical signals in response to changes in a physical parameter being monitored by the sensor system, the plurality of electromechanical sensor arrays being further arranged such that each one of the plurality of optical interferometers is connected to a corresponding one of the plurality of electromechanical sensor arrays to produce phase difference signals in response to electrical signals produced by the electromechanical sensor arrays.

5. The sensor system of claim 4 wherein the plurality of optical interferometers is arranged to provide return pulsed optical signals to the optical fiber in response to electrical signals produced by the plurality of electromechanical sensor arrays.

6. The sensor system of claim 5 wherein each of the interferometers includes a phase modulator connected to the corresponding electromechanical sensor array.

7. The sensor system of claim 5, further comprising a demodulator arranged to receive optical signals output from the plurality of optical interferometers and produce corresponding electrical signals.

8. A sensor system, comprising:
   a plurality of optical signal sources arranged to provide corresponding optical signal outputs;
   a plurality of input optical fibers arranged such that each of said plurality of optical fibers receives the optical signal output from a corresponding one of the plurality of optical signal sources;
   a plurality of optical interferometers coupled to each one of the optical fibers; and
   a plurality of electromechanical sensor arrays arranged to produce electrical signals in response to changes in a physical parameter being monitored by the sensor system, the plurality of electromechanical sensor arrays being further arranged such that each one of the plurality of optical interferometers is connected to a corresponding one of the plurality of electromechanical sensor arrays to produce phase difference signals in response to electrical signals produced by the electromechanical sensor arrays.

9. The sensor system of claim 8, further comprising:
   a detector array; and
   a plurality of output optical fibers arranged to guide signals output from the plurality of optical interferometers to the detector array.

10. The sensor system of claim 8 wherein each of the plurality of optical signal sources includes a phase modulator, the phase modulators being arranged so that each of the optical signal outputs is modulated at a different frequency.

* * * * *